United States Patent
Liersch et al.

(10) Patent No.: US 9,385,401 B2
(45) Date of Patent: Jul. 5, 2016

(54) RECHARGEABLE BATTERY PACK AND ELECTRICAL HAND TOOL DEVICE

(71) Applicants: Ralph Liersch, Metzingen (DE); Wolfgang Stickel, Beuren (DE); Jochen Graeber, Bissingen (DE)

(72) Inventors: Ralph Liersch, Metzingen (DE); Wolfgang Stickel, Beuren (DE); Jochen Graeber, Bissingen (DE)

(73) Assignee: METABOWERKE GMBH, Nuertingen (DE)

( * ) Notice: Subject to any disclaimer, the term of this patent is extended or adjusted under 35 U.S.C. 154(b) by 297 days.

(21) Appl. No.: 14/156,787

(22) Filed: Jan. 16, 2014

(65) Prior Publication Data
US 2014/0162089 A1 Jun. 12, 2014

Related U.S. Application Data

(63) Continuation of application No. 12/067,367, filed on Mar. 19, 2008, now Pat. No. 8,663,834.

(30) Foreign Application Priority Data

Sep. 20, 2005 (WO) ................ PCT/EP2005/010108

(51) Int. Cl.
| | |
|---|---|
| *H01M 10/42* | (2006.01) |
| *H01M 2/10* | (2006.01) |
| *H01M 2/20* | (2006.01) |
| *H01M 2/22* | (2006.01) |
| *H01M 10/46* | (2006.01) |
| *H01M 10/052* | (2010.01) |

(52) U.S. Cl.
CPC ............ *H01M 10/425* (2013.01); *H01M 2/105* (2013.01); *H01M 2/204* (2013.01); *H01M 2/22* (2013.01); *H01M 10/46* (2013.01); *H01M 10/052* (2013.01)

(58) Field of Classification Search
CPC . H01M 10/425; H01M 10/46; H01M 10/052; H01M 2/105; H01M 2/264; H01M 2/22
USPC ............................................................ 429/7
See application file for complete search history.

(56) References Cited

U.S. PATENT DOCUMENTS

| | | | |
|---|---|---|---|
| 2004/0115519 | A1 | 6/2004 | Lee |
| 2005/0031945 | A1 | 2/2005 | Morita et al. |

FOREIGN PATENT DOCUMENTS

| | | |
|---|---|---|
| DE | 3246938 | 7/1984 |
| EP | 1109237 | 6/2001 |
| EP | 05 793 680.9-1360 | 3/2014 |
| JP | 2004-031284 | 1/2004 |
| JP | 3837366 | 10/2006 |

OTHER PUBLICATIONS

European Patent Office Search Report dated Mar. 4, 2014.

*Primary Examiner* — Karie O'Neill Apicella
(74) *Attorney, Agent, or Firm* — Randall Danskin

(57) ABSTRACT

The invention relates to a rechargeable battery pack, for use with an electrical hand tool device and which includes at least two series-connected rechargeable battery cells and/or rechargeable battery cell blocks, and an electronics unit having a printed circuit board, and wherein sheet metal conductors for electrically connecting the series-connected rechargeable battery cells and/or rechargeable battery cell blocks are provided, and wherein the sheet metal conductors are connected directly to the printed circuit board.

15 Claims, 2 Drawing Sheets

RECHARGEABLE BATTERY PACK AND ELECTRICAL HAND TOOL DEVICE

The present invention relates to a rechargeable battery pack and, in particular to one for use in a hand-held power tool, comprising at least two battery cells or battery cell blocks connected in series, and an electronics unit with a printed circuit board, and wherein sheet metal conductors are provided for electrically connecting the in-series connected battery cells or battery cell blocks with the printed circuit board.

It is well known to use battery packs for operating hand-held power tools because cordless tools offer greater flexibility during work and, in particular, independence from an existing, fixed power source. This allows work conducted outside to be independent of the requirements of an electrical power outlet. Cordless tools include a rechargeable battery in a battery housing and that can be coupled with the tool housing of the hand-held power tool, and where, upon coupling of the two housings, the motor is electrically connected to the battery pack, and is supplied with electricity from it. To couple the two housings, the battery housing is typically provided with a protruding locking device that is inserted into, and engages within a complementing socket of the tool housing. The electrical contacts are typically established in the area of the locking device, As a rule, it is common to connect the individual battery cells, or the individual battery cell blocks, respectively, in series. At times, so-called sheet metal conductors are used and which provide the electrical connection of the respective complementary poles of a battery cell to each other.

A similar design for a battery is, for example, known from DE 94 04 070.2 and which further describes a battery set, and wherein individual batteries are arranged in battery holding cells, and whereby sheet metal conductors are used to provide the series electrical connection of the individual batteries to each other. Here, the sheet metal conductors are arranged in a curved manner according to the description. In addition, it is known for lithium ion batteries, and where the charge level and the charging procedure are monitored via the electronics of the battery pack, to further provide that the individual battery cells be electrically connected with the electronics for the purpose of monitoring their cells, To this end, the state-of-the-art provides stranded wires that connect the battery cells with the electronics unit and in particular, with the pc-board. One disadvantage of this arrangement is the relatively high cost of the resulting assembly.

It is, therefore, an objective of the present invention to provide a battery pack, and where the series electrical connections of the battery cells to each other as well as the connection to the pc-board are simplified.

According to the teachings of the present invention, this is done in a fashion such that a battery pack of the generic kind is provided with sheet metal conductors which are electrically connected directly with the pc-board. In this manner, there is no need to additionally establish contacts between the individual battery cells and the electronics using stranded wires. It is particularly advantageous if the sheet metal conductors are used to establish both an electrical, and a mechanical connection between the individual battery cells and the pc-board. In this manner, a support for the pc-board can be achieved by the sheet metal conductors in relation to a battery cell or a battery cell block at the same time. In this novel arrangement, a battery cell block refers to two or more battery cells that are switched in parallel and are connected in series to additional battery cells or battery cell blocks.

It can be provided in the present intervention that the sheet metal conductors are designed geometrically such that they protrude from the side of the pc-board in the form of terminal lugs. They can then be angled such that they point from the pc-board in the direction of the battery cells. Other arrangements are also possible.

It is particularly advantageous if the sheet metal conductors are fastened to the pc-board by rivet joints. Rivet joints provide both a very simple mechanical and electrical contact and further exhibit great reliability. Finally, using appropriate rivet joints can provide tolerance compensation as well as thermal expansion compensation, In general, the mechanical as well as the electrical connection via sheet metal conductors to the pc-board offers the advantage that the pc-board is spring-supported in relation to the battery cells or the battery cell blocks, respectively, because the sheet metal conductors tend to act, at least in part, as spring elements. This achieves additional vibration strength because of the vibrations that typically occur within hand-held power tools, and in particular, with the use of impact drills or hammer drills.

The combination of these various inventive aspects in one component establishes the particular novel advantages of the present invention.

In particular, the battery cells as employed in the present invention can be lithium ion cells. When employing lithium ion cells, it is possible to combine several battery cells into so-called, battery cell blocks, and where several battery cells are connected in parallel. In this arrangement, one battery cell block is connected with the electronics. Using the electronics, among other things, the charge level can be monitored via the voltage of the individual cells. In addition, the charging process can be controlled. The voltage for parallel connected cells is always the same; thus, for battery cell blocks, the voltage must be determined for each block.

By connecting the battery cells, or the battery cell blocks, respectively, to the printed circuit board, or pc-board, it can be determined, whether all battery cells are charged properly and/or whether a charging current is reached, and which the battery cells are not able to handle. Furthermore, a control can be provided that controls the charge current such that overloading of the individual battery cells is prevented, yet all the battery cells can be charged fully. This results in a good usability of the respective battery pack, and thus of the hand-held power tool using the battery pack over a long time. In this regard, the poles of the individual battery cells can have a material connection, especially through welding or soldering, to the sheet metal conductors. In addition, it can be provided that the battery cells are supported by a battery cell carrier and are kept at a distance from each other in this carrier. This avoids electrical shorts caused by contact between the individual battery cells. The cell carrier can be made of a non-conductive injection-molded component that defines respective receptacles for the individual battery cells. Furthermore, fastening elements can be provided at the cell carrier that are used to connect the cell carrier holding the battery cells, which, as a unit, are called corepack, with the electronics unit. In one form of the invention, a respective electrical connection can be established, for example, via a latch connection and where respective latching devices are provided at the corepack, and in which latch protrusions reach behind the electronics unit under mechanical deformation, and in this manner provide a positive connection or coupling.

In addition to the pc-board, the electronics unit may also include an electronics housing in which the pc-board with the attached sheet metal conductors can be placed. Finally, the pc-board holds a number of other electronics elements, and a software for controlling or even for recognizing the battery pack can also be loaded onto the pc-board. Additional components, and in particular switches, but also charge level indicators, may also be connected with the pc-board. The pc-board is then, in particular, inserted into the electronic housing, and the electronic housing is then subsequently sealed using a resin such that the pc-board is positively connected with the electronics housing. Finally, the invention relates to a hand-held power tool with an electric motor, and a detachable battery pack of the kind described, above, and that can be locked together with said motor, and which further drives the motor, and wherein, further, a device for establishing the mechanical and electrical contact of the battery pack with a housing of the hand-held power tool is also provided, In the following, the invention shall be described in greater detail using several drawings and whereby FIG. 1 shows an exploded view of the electronics unit as well as the corepack of a battery pack;

Figure 1:
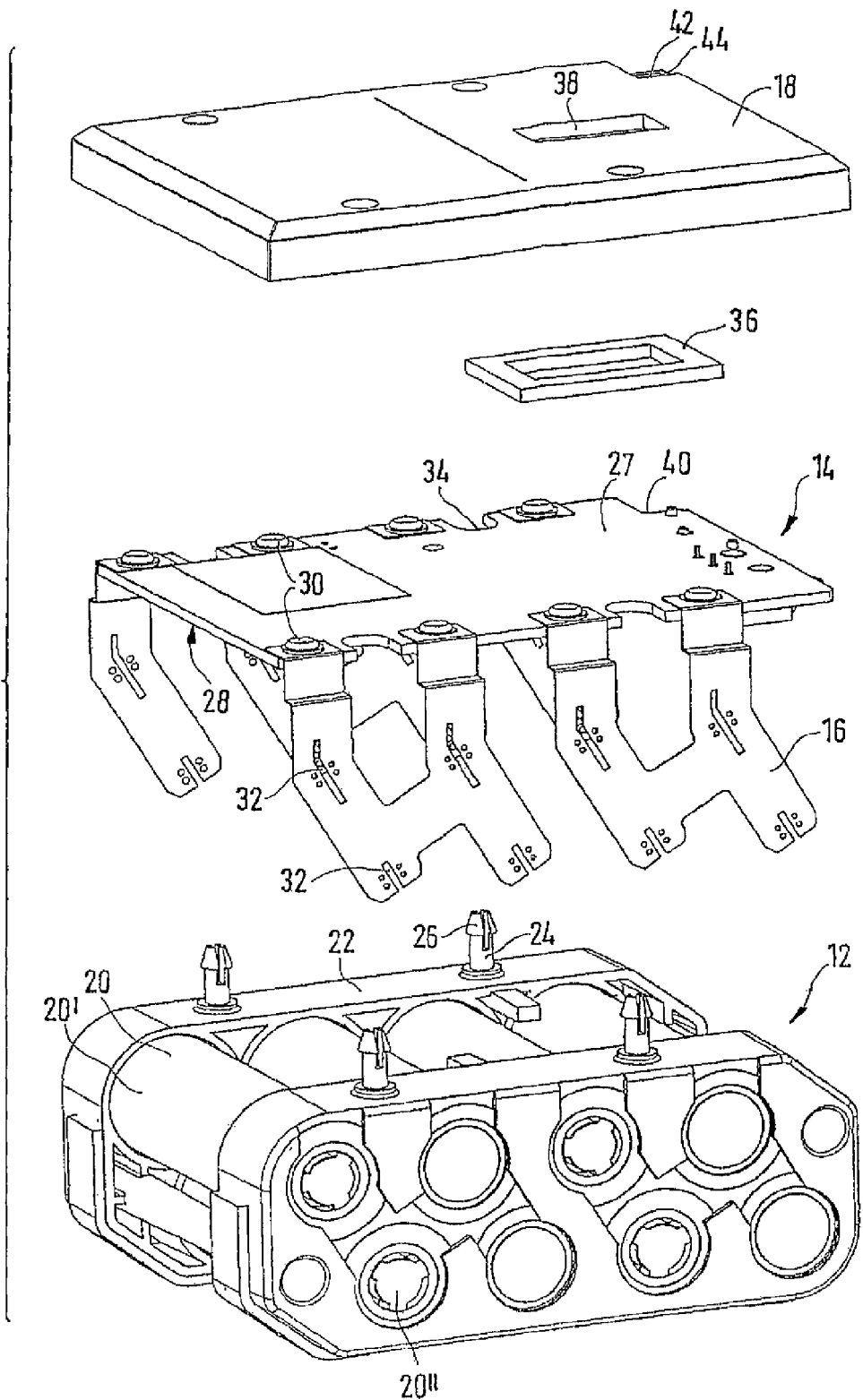

FIG. 1 shows an exploded view of a corepack (bottom image) which in its entirety is designated with the number 12; as well as a pc-board 14 with sheet metal conductors 16 (center image); and an electronics housing 18 (top image).

The corepack 12 comprises battery cells 20, whereby two cells 20' and 20" each are connected in parallel to form one battery cell block. The battery cells 20 are lithium ion cells that, contrary to nickel cadmium cells, allow for parallel connections. The battery cell blocks consist of the battery cells 20' and 20" and which are each further connected in series. The battery cells 20 are supported by a cell carrier 22, and are additionally separated from each other by said cell carrier such that the battery cells 20 do not contact each other, and which could potentially lead to electrical shorts. The poles of the individual battery cells 20 are left open in the cell electrical carrier 22 such that electrical contacting can be carried out.

In addition, a latching device 24 is provided at the cell carrier 22, and which consists of four pins that are provided with corresponding latches 26. The latches 26 are slotted such that bouncing of the latch halves towards each other occurs in such a manner that the pins 24, including the latches 26, can be guided through an opening, and then, after rebounding, a locking occurs behind the protrusion.

Later, during assembly, the electronics unit shown in the center image is placed on the corepack 12. The electronics unit includes a pc-board 14 that features various soldering points on its upper side 27, and also an electronic circuit that allows for loading a software. Additional electronics assemblies are located on the bottom side 28 of the pc-board 14, for example, light sources for indicating a given electrical charge level and switches, etc.

The sheet metal conductors 16 are connected with the pc-board 14 by utilizing rivets 30, and have a material and electrical connection with the poles of the battery cells 20 via contact areas 32. Both the parallel and the series connections among the individual battery cells are carried out using the sheet metal conductors 16. In addition, the sheet metal conductors 16 provide an electrical connection with the electronics via the rivets 30 that are used to attach the sheet metal conductors 16 to the pc-board 14. Other electrical connections are, of course possible. A connection of the cells 20 with the electronics using sheet metal conductors has the advantage that vibrations can be compensated for because the sheet metal conductors 16 act as spring elements, and in addition to the electrical connection a mechanical connection between the pc-board and battery cells is further established, and that locates the pc-board at the battery cells 20 after being welded to them.

In addition, in one possible form of the invention, the pc-board 14 exhibits recesses 34 that are located in the area of the pin 24 and surround at least in part, the pin.

Prior to the assembly of the invention, the pc-board 14 with the corepack is connected to an electronics housing 18, which is shown in FIG. 1. For this purpose, a sponge rubber element 36 is placed on the pc-board 14, and the pc-board and the sponge rubber element 36 are then inserted into the electronics housing 18. Thereafter, the electronics housing 18 is sealed with a resin such that a solid connection between the pc-board 14 and the electronics housing 18 is established.

Figure 2:
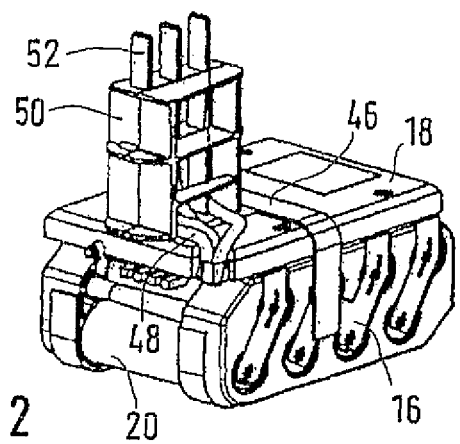
FIG. 2 shows a battery pack without a battery housing.

A respective connection can be seen or understood in FIG. 2, and where the sealing of the electronics components, for example, the pc-board 14, etc. with the electronics housing 18 has already been carried out. The sponge rubber element 36 (FIG. 1) prevents the cast resin from entering the passage area 38. Later, loading of the earlier mentioned software onto the pc-board is done via this passage area 38, Furthermore, both the pc-board 14, and the electronics housing 18 exhibits a recess 40, or 42, respectively, which are formed in one corner area, and through which cables 48 (ref. FIG. 2) can be routed from the bottom side of the pc-board 14 to the top side of the electronics housing 18 in one possible form of the invention. For this purpose, the recess 42 of the electronics housing 18 exhibits a clamp 44 that provides a guide for the cable 48. In the passage area 38, the cables 48 are then connected to a connection pin or electrical connector 50, and then guided or electrically coupled to the terminals 52, and which later serves the purpose of establishing the electrical contact with a hand-held power tool (FIG. 2).

In addition, FIG. 2 shows an already assembled battery pack, however, without a battery housing. In this case, the electronics unit comprising the electronics housing 18 as well as the no longer recognizable pc-bard 14 have already been connected to the battery cells 20 by welding. For further dampening, an additional dampening element 46 in the form of a foam strip is placed between the housing and the electronics housing prior to assembly.

Finally, a mechanical latching device for the battery pack with the hand-held power tool is provided using the housing.

Figure 3:
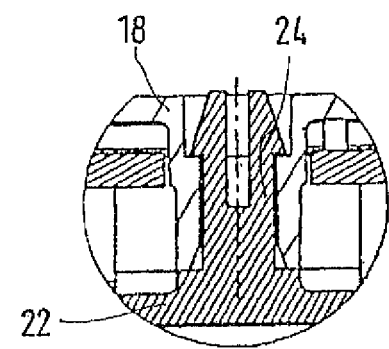
FIG. 3 shows a detail of FIG. 2 with regard to locking.

FIG. 3 shows a detail, in one form of the invention, and where the locking of the corepack 12 via the cell carrier 22, and the slotted pin 24 to the electronics housing 18, can be seen. With regard to their positions, the pins 24 are designed such that after locking they do not protrude beyond the surface of the electronics housing 18, or protrude only insignificantly.

Using the method and arrangement as described, above, an electrical and mechanical connection between battery cells 20 to a pc-board can be realized in a particularly simple manner. Through the electrical connection, it is possible to determine the charge level of the individual battery cells 20, or battery cell blocks, through the voltage, and then use this information to control the charging procedure. In addition, such an arrangement offers the advantage of a reliable electrical connection of the battery cells 20 to each other and to the electronics as well as a vibration strength.

The invention claimed is:

1. A rechargeable battery pack for a hand held power tool, comprising:
   a multiplicity of elongated battery cells each having opposite anode and cathode ends, and which stores a source of electricity, and wherein the respective elongated battery cells are further oriented in a parallel, spaced relationship, one relative to the other battery cells;
   a pair of non-conductive, spaced, battery carriers, and wherein the respective battery carriers each have a peripheral edge, and wherein the respective battery carriers further define a multiplicity of openings in a given pattern, and which allows access to the opposite anode and cathode ends of the respective elongated battery cells, and wherein the spaced battery carriers individually supportingly engage and maintain the multiplicity of battery cells in predetermined, spaced parallel relationship one relative to the others;

a sheet metal conductor having a proximal end which extends through at least one of the openings which is defined by the respective battery cell carriers, and is further electrically coupled with the anode and cathode ends of at least some of the elongated battery cells, and wherein the sheet metal conductor has an opposite distal end;

a printed circuit board juxtaposed relative to, and cooperating with, at least one of the non-conductive battery carriers, and wherein the distal end of the sheet metal conductor is electrically coupled to the printed circuit board, and wherein the source of electrical power which is stored in the respective elongated battery cells is delivered to the printed circuit board; and a releasable electrical connector which is electrically coupled with the printed circuit board, and which further includes a plurality of electrical terminals, and wherein the plurality of electrical terminals which are made integral with the releasable electrical connector releasably, matingly and electrically couples with a hand held power tool so as to supply the stored electricity provided by the respective elongated battery cells to the hand held power tool.

2. A rechargeable battery pack as claimed in claim 1, and wherein the sheet metal conductor is connected both mechanically and electrically to the printed circuit board by way of a connection element.

3. A rechargeable battery pack as claimed in claim 2, and wherein the connection element comprises a rivet joint.

4. A rechargeable battery pack as claimed in claim 2, and wherein the connection element comprises solder.

5. A rechargeable battery pack as claimed in claim 1, and wherein the elongated battery cells are lithium ion batteries.

6. A rechargeable battery pack as claimed in claim 1, and wherein the elongated battery cells comprise at least two battery cells which are electrically coupled in parallel relation, one relative to the other.

7. A rechargeable battery pack as claimed in claim 1, and wherein the sheet metal conductor is connected to the anode and cathode ends of the elongated battery cells by welding or soldering.

8. A rechargeable battery pack as claimed in claim 1, and further comprising:
an electronics housing for enclosing the printed circuit board, and the sheet metal conductors.

9. A rechargeable battery pack as claimed in claim 8, and wherein the electronics housing is coupled to at least one of the spaced battery carriers.

10. A rechargeable battery pack as claimed in claim 9, and wherein the hand held power tool includes a coupling arrangement which is borne on the hand held power tool, and which is further operable to releasably electrically engage and matingly, mechanically cooperate with the releasable electrical connector which is electrically coupled to the printed circuit board, so as to couple the rechargeable battery pack to the hand held power tool.

11. A rechargeable battery pack as claimed in claim 1, and wherein the sheet metal conductor is shaped so as to protrude, at least in part, laterally outwardly relative to the printed circuit board and form a terminal lug, and wherein the terminal lug is oriented and extends in the direction of the multiplicity of elongated battery cells.

12. A rechargeable battery pack as claimed in claim 1, and wherein the non-conductive battery carriers are injection molded, and further define individual receptacles for matingly supporting each of the multiplicity of elongated battery cells in parallel, spaced relation, one relative to the others.

13. A rechargeable battery pack as claimed in claim 1, and wherein the printed circuit board further includes a charge level indicator and/or individual electrical switches.

14. A rechargeable battery pack as claimed in claim 1, and wherein at least some of the elongated battery cells are electrically joined together to form a battery cell block, and wherein the individual batteries forming the battery cell block are electrically coupled together in parallel relation.

15. A rechargeable battery pack as claimed in claim 1, and wherein the printed circuit board is substantially planar, and is further oriented in a predetermined, substantially parallel plane, and spaced relationship relative to the multiplicity of elongated battery cells.

* * * * *